(12) United States Patent
Edström et al.

(10) Patent No.: US 11,131,468 B2
(45) Date of Patent: Sep. 28, 2021

(54) DEVICE FOR CONTINUOUS WATER ABSORPTION AND AN AIR COOLER

(71) Applicant: DRUPPS GROUP AB, Uppsala (SE)

(72) Inventors: Fredrik Edström, Uppsala (SE); Per Dahlbäck, Uppsala (SE)

(73) Assignee: DRUPPS GROUP AB

(*) Notice: Subject to any disclaimer, the term of this patent is extended or adjusted under 35 U.S.C. 154(b) by 0 days.

(21) Appl. No.: 16/315,545

(22) PCT Filed: Jun. 29, 2017

(86) PCT No.: PCT/SE2017/050726
§ 371 (c)(1),
(2) Date: Jan. 4, 2019

(87) PCT Pub. No.: WO2018/009125
PCT Pub. Date: Jan. 11, 2018

(65) Prior Publication Data
US 2019/0331353 A1    Oct. 31, 2019

(30) Foreign Application Priority Data
Jul. 6, 2016   (SE) ................................. 1650994-5

(51) Int. Cl.
*F24F 3/14*      (2006.01)
*B01D 53/14*     (2006.01)
*B01D 53/26*     (2006.01)

(52) U.S. Cl.
CPC ........ *F24F 3/1417* (2013.01); *B01D 53/1425* (2013.01); *B01D 53/263* (2013.01); *B01D 2251/402* (2013.01); *B01D 2251/60* (2013.01)

(58) Field of Classification Search
CPC . F24F 3/1417; B01D 53/1425; B01D 53/263; B01D 2251/402; B01D 2251/60
USPC .............................................................. 62/94
See application file for complete search history.

(56) References Cited

U.S. PATENT DOCUMENTS

| | | |
|---|---|---|
| 4,373,347 A | 2/1983 | Howell et al. |
| 4,380,910 A | 4/1983 | Hood et al. |
| 4,719,761 A | 1/1988 | Cromer |
| 5,097,668 A | 3/1992 | Albers et al. |
| 5,351,497 A | 10/1994 | Lowenstein |
| 5,732,562 A | 3/1998 | Moratalla |
| 5,791,157 A | 8/1998 | Kensaku |
| 5,797,272 A | 8/1998 | James |

(Continued)

FOREIGN PATENT DOCUMENTS

| | | |
|---|---|---|
| CN | 1172127 C | 10/2004 |
| FR | 2446995    * | 8/1980 |

(Continued)

OTHER PUBLICATIONS

International Preliminary Report on Patentability for PCT/SE2017/050726, dated Dec. 3, 2018, 14 pages.

(Continued)

*Primary Examiner* — Steve S Tanenbaum
(74) *Attorney, Agent, or Firm* — Adsero IP

(57) ABSTRACT

The present invention relates to a device for absorbing water using a liquid desiccant and the regeneration of said liquid desiccant by evaporating the absorbed water. The device may further be used in an air cooler.

18 Claims, 8 Drawing Sheets

(56) References Cited

U.S. PATENT DOCUMENTS

| | | | | |
|---|---|---|---|---|
| 5,966,955 A | * | 10/1999 | Maeda | F24F 3/1423 62/238.3 |
| 8,052,847 B2 | | 11/2011 | Koban et al. | |
| 8,943,844 B2 | | 2/2015 | Forkosh | |
| 2004/0031282 A1 | * | 2/2004 | Kopko | F28D 9/0081 62/271 |
| 2006/0130654 A1 | * | 6/2006 | King | C02F 1/16 95/231 |
| 2015/0292754 A1 | | 10/2015 | Mongar | |
| 2016/0033192 A1 | | 2/2016 | Martin | |

FOREIGN PATENT DOCUMENTS

| | | | | |
|---|---|---|---|---|
| FR | 2446995 A1 | | 8/1980 | |
| JP | 62-23418 | | 1/1987 | |
| JP | 6223418 B2 | * | 1/1987 | H02K 31/02 |
| JP | 2005233435 | | 9/2005 | |
| JP | 6223418 B2 | * | 11/2017 | H02K 16/02 |
| WO | 99/54667 | | 10/1999 | |
| WO | 2016/053162 | | 4/2016 | |

OTHER PUBLICATIONS

International Search Report for PCT/SE2017/050726, dated Nov. 30, 2017, 5 pages.
Communication pursuant to Article 94(3) EPC for Application 17735654.0, dated Jan. 23, 2020, 7 pages.
European Search Report for EP 20183391.0, dated Jan. 21, 2021, 8 pages.
Office Action issued for CN 201780042222.1 dated Mar. 25, 2021 (English translation) 19 pgs.

* cited by examiner

US 11,131,468 B2

DEVICE FOR CONTINUOUS WATER ABSORPTION AND AN AIR COOLER

CROSS-REFERENCE TO RELATED APPLICATION

This application claims priority to and is a 35 U.S.C. § 371 national phase application of PCT/SE2017/050726 (WO2018/009125), filed on Jun. 29, 2017 entitled "DEVICE FOR CONTINUOUS WATER ABSORPTION AND AN AIR COOLER", which application claims priority to and the benefit of Sweden Patent Application No. 1650994-5 (SE), filed Jul. 6, 2016, the disclosures of which are incorporated herein by reference in their entirety.

FIELD OF THE INVENTION

The present invention relates to a device for absorbing water from a gas and a method of absorbing water from gas where the process is a continuous process where a liquid desiccant is regenerated. The device may be used in a humidifier to prepare cool and humidified air.

BACKGROUND

There are many ways of extracting water from air but many of them are struggling with efficiency.

By using a liquid desiccant the vapour or water in the air may be absorbed and stored in the desiccant. The amount of water that may be stored in a liquid desiccant depends on the desiccants ability to absorb at different humidity. In order to use the same desiccant to absorb new vapour the desiccant needs to be regenerated. When the liquid desiccant is heated the vapour pressure in the desiccant increases. When the vapour pressure in the liquid desiccant becomes higher than the surrounding vapour pressure the absorbed water is vaporised. In this way liquid desiccant may be regenerated and reused. The amount of water, m, that may be absorbed/desorbed per second can be described by:

$$\frac{dm}{dt} = kA(P_m - P_a) \quad (1)$$

where $$\frac{dm}{dt}$$

is the amount of water absorbed/desorbed per second, k is a material constant, A is the area of the hygroscopic material and $P_m$ is the vapour pressure in the liquid desiccant and $P_a$ is the vapour pressure in the gas surrounding the liquid desiccant.

Several methods for dehumidify air using a vapour compression system have been invented. WO2011/062554 discloses a device for absorbing water or moisture from air using water absorbing material. The water is removed from said material by heating the material evaporating the water and letting the formed steam condense on the walls of the device.

U.S. Pat. No. 5,351,497 discloses the use of a liquid desiccant in an air conditioner where the gas is treated with a liquid desiccant and being cooled at the same time. The liquid desiccant may be regenerated by heating the liquid desiccant in order to remove water.

Sorption cooling technique today suffers from the large need of water in order to cool air. This is very limiting especially in regions where water is a scarcity.

However, there is a need for a more energy efficient way of regenerating the liquid desiccant and a more efficient way to use energy. Overcoming these issues would lead to more efficient methods to control air humidity and to condense water vapour.

SUMMARY OF THE INVENTION

The object of the present invention is to provide a device which overcomes the drawbacks of prior art.

In a first aspect the present invention relates to a device for absorbing water from a gas comprising:

a first housing (2) having a first gas inlet (4) and a first gas outlet (5), at least one means for dispensing a liquid desiccant (7), optionally means (9) for increasing the contact time and contact area between the gas and the liquid desiccant, optionally a demister (11) arranged after the means for dispensing a liquid desiccant (7) in the direction of the gas flow and a liquid desiccant collecting part (13) having an outlet (15);

whereby the device is configured to allow a gas to flow from the first gas inlet (4) of the first housing, via means (9) and to exit through the first gas outlet (5) and whereby the device is configured to allow the liquid desiccant to be dispensed and brought into contact with the gas flow and collected at the desiccant collecting part (13);

at least one second housing (21) comprising a first inlet (22), an outlet (30), a second heating device (23) or a second heat exchanger configured to heat the liquid desiccant in the second housing to produce vapour (W1), wherein the second heat exchanger (29) have an inlet and an outlet (28) and wherein the second heat exchanger is in thermal contact with the liquid desiccant in the second housing (21), wherein the second housing (21) communicates with a third heat exchanger (65) having an outlet (67) or a compressor (27) wherein the third heat exchanger is configured to condense the water in the vapour (W1) from the second housing and the compressor (27) is configured to compress the vapour (W1) and wherein the compressor (27) communicates with the inlet of the second heat exchanger (29);

optionally a primary first heat exchanger (19) having a first inlet (18) communicating with the outlet (15) of the liquid desiccant collecting part (13), a first outlet communicating with a first inlet (22) of a second housing (21), a second inlet communicating with a first outlet (30) of the second housing (21) and a second outlet (33) communicating with the means for dispensing a liquid desiccant (7);

wherein at least one pump is arranged in the device configured to facilitate a flow of the liquid desiccant from the outlet (15) to the means for dispensing a liquid desiccant (7);

whereby the device is configured to allow the liquid desiccant exiting outlet (15) to optionally enter the primary first heat exchanger (19) via inlet (18), and into the second housing (21) via inlet (22), and to allow a liquid desiccant to exit the second housing (21) via the first outlet (30) to the optionally primary first heat exchanger (19) via inlet (32) and exit the primary first heat exchanger (19) via outlet (33)

to the means for dispensing the liquid desiccant (7); wherein the device is further configured to heat the liquid desiccant in the second housing (21) with the second heating device (23) and/or the second heat exchanger (29) to generate vapour; wherein the device is configured to allow the vapour to be heat exchanged in the third heat exchanger (65) in order to condensate water which may be collected from the outlet (67) or to allow the vapour to be compressed in the compressor (27) and wherein the vapour is allowed to condense in the second heat exchanger (29) and exit through the outlet (28).

In one embodiment the device further comprises a control unit (36), a sensor (14) arranged in the desiccant collecting part (13) and adapted to determine the water content in the desiccant and wherein the sensor (14) communicates with the control unit (36), at least two means for dispensing a liquid desiccant (7) and wherein said means (7) is a spraying means;
wherein the first housing comprises a part configured to allow a horizontal gas flow and wherein the at least two means for dispensing the liquid desiccant (7) are arranged in said part;
wherein the second housing further comprises a demister (80) arranged prior to the compressor (27); and
wherein a secondary first heat exchanger (19') is arranged between the primary first heat exchanger (19) and the second housing (21) and wherein the secondary first heat exchanger has a first and a second inlet (24) and (35) respectively communicating with the first outlet (20) of the primary first heat exchanger (19) and the outlet of the second heat exchanger (28) respectively, and a first and a second outlet (26) and (31) respectively wherein the first outlet communicates with the first inlet (22) of the second housing.

In a second aspect the present invention relates to an air cooler comprising the device according to the present invention further comprising a humidifier comprising a third housing (38) having a first inlet (40) and first outlet (42), means for dispensing water (44), optionally means (48) for increasing the contact time and contact area between the gas and the water, optionally a demister arranged after the means for dispensing water (46), a water collecting part (50) having an outlet (52) wherein the first gas outlet (5) of the first housing communicates with the first inlet (40) of the third housing (38).

In a third aspect the present invention relates to an air cooler comprising the device according to the embodiment of the device according to the present invention disclosed above and further comprising a humidifier comprising a third housing (38) having a first inlet (40) and first outlet (42), and means for dispensing the water (44),
wherein the third housing (38) comprises a part configured to allow a horizontal gas flow and wherein the means for dispensing the water (44) is arranged in said part and wherein the means for dispensing the water (44) is arranged so that the dispensing of water is done essentially in the direction of the gas flow;
wherein the means for dispensing water (44) communicates with the second outlet (31) of the secondary first heat exchanger (19');
wherein the air cooler further comprises a cooling device (60) wherein the cooling device communicates with each of the second outlet (33) of the primary first heat exchanger, the second outlet (31) of the secondary first heat exchanger and/or the water collecting part (50), and the desiccant collecting part (13) and wherein the cooling device is arranged prior to the means for dispensing a liquid desiccant (7) and the means for dispensing water (44) in the direction of the flow of the liquid desiccant and water respectively;
wherein the air cooler further comprises optionally a restrictor (66) arranged between the second outlet (31) of the secondary first heat exchanger (19') and the cooling device (60); and
wherein the air cooler comprises a pump (68) a pump arranged between the cooling device (60) and the at least two means for dispensing a liquid desiccant (7), a pump (70) arranged between the cooling device (60) and the at least two means for dispensing a liquid desiccant (7') and a pump (72) arranged between the cooling device and means for dispensing water (44); and
wherein the first gas outlet (5) of the first housing communicates with the first inlet (40) of the third housing (38).

The embodiments presented below are applicable to all aspects of the present invention.

DETAILED DESCRIPTION OF THE INVENTION

In the present application the wordings "water absorbing material", "water absorption material" and "hygroscopic material" are used interchangeably.

The present invention is aimed at extracting water from gas, preferably air, to either produce water or remove the water from the gas such as air. The latter could be used for example, but not limited to, for dehumidification of indoor environments or in air-conditioning devices. The present invention may also be used for drying of substances such as wood or timber.

Device for Water Absorption

The device according to the present invention is designed for water absorption from a gas, for example from air. The device may be integrated into another device or may be a standalone device.

Figure 1:
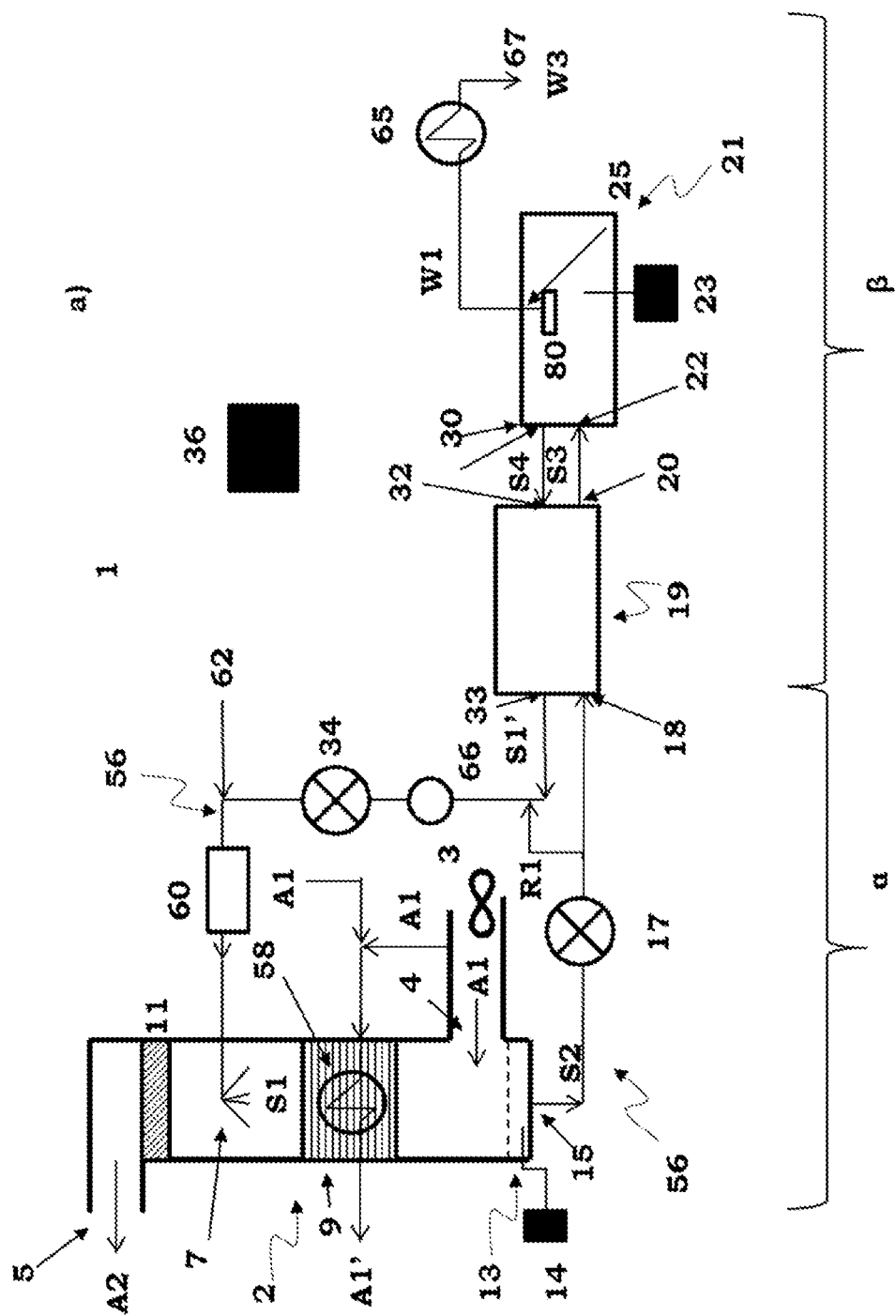
FIG. 1a)-1c) schematic views of a cross-sections of the present invention.

Referring now to FIG. 1a)-c). The device 1 according to the present invention comprises a water absorption section α and a liquid desiccant regenerating section β where a gas is dried in the water absorption section α and the liquid desiccant used to absorb the water or moisture is regenerated in the regeneration section β. The sections in the figures are schematically marked and should not be viewed as limited. The device 1 comprises a first housing 2 with a first gas inlet 4 and a first gas outlet 5 and where said inlet and outlet may both be sealable using any suitable means to close or seal said inlet and outlet. The suitable means to close or seal the inlet or outlet may be valves, check valves, door, shutter or gate. The housing may be thermally insulated. The housing 2 comprises at least one means for dispensing a liquid desiccant 7 and means 9 for increasing the contact time and/or contact area between the gas and the liquid desiccant S1. The means 9 for increasing the contact time and contact area between the gas and the liquid desiccant may be arranged prior to the means for dispensing a liquid desiccant 7 in the gas flow direction or it may be arranged adjacent to or in contact with the means for dispensing the liquid desiccant. The means for dispensing the liquid desiccant 7 may be arranged in the housing 2 at angle of or close to perpendicular to the gas flow. The housing 2 further comprises a liquid desiccant collecting part 13 having an outlet 15 allowing removal of collected liquid desiccant. The liquid desiccant collecting part 13 is preferably arranged at a bottom section of the first housing 2 so that the liquid desiccant will fall or flow down to the collecting part after brought into contact with the gas flow. The collecting part 13 may be a separable part from the housing 2 or it may be an inseparable part of the housing 2. The collecting part 13 may be made of the same material as the first housing 2 or it may be made of another material.

In one embodiment the housing comprises two means for dispensing a liquid desiccant 7. In another embodiment the housing comprises three or more means for dispensing a liquid desiccant. When there is more than one means for dispensing the liquid desiccant each mean may dispense different liquid desiccants or different concentrations of liquid desiccants. Preferably the section α comprises two or more means such as three or more means for dispensing the liquid desiccant 7 and preferably the means dispensing the regenerated and the more concentrated desiccant 7' is arranged last of the means in the direction of the gas flow. This is believed to be a more efficient way to absorb water from the gas.

The liquid desiccant S1 may be any solution that may absorb water from a gas or air. The solution contains any suitable absorption material where the absorption material may be LiCl, $CaCl_2$, $MgCl_2$, $NaNO_3$, sulphates or any suitable material known to a person skilled in the art or combinations thereof. In one embodiment the liquid desiccant contains LiCl, $CaCl_2$ or $MgCl_2$, preferably LiCl or $MgCl_2$ more preferably $MgCl_2$ (magnesium chloride). The advantage of magnesium chloride is that a liquid desiccant containing it absorbs water to a high extent, it has a low reactivity, has a low toxicity, is cheap and it does not increase the boiling temperature of the water in the liquid desiccant significantly. The absorption material may be in the form of salt, particles or powder. The concentration of the liquid desiccant is near saturated, saturated or over saturated. In one embodiment the liquid desiccant is saturated or over saturated with the absorption material.

The inlet 4 and the outlet 5 of the housing 2 and the means 7 and 9 are arranged so that gas A1 may flow from the first inlet 4 of the housing 2 and the gas is allowed to come in contact with the means 9 for increasing the contact time and contact area between the gas and the liquid desiccant S1. A liquid desiccant is dispensed through the means 7 continuously or discontinuously so that the gas A1 passing through the housing 2 comes in contact with the liquid desiccant. The means 9 for increasing the contact time and contact area between the gas and the liquid desiccant may be in the form of baffles, particles or beads or a bed of particles or beads. The water or moisture in the gas A1 is absorbed by the water absorption material in the liquid desiccant and the gas A2 exiting through the outlet 5 is dry or at least drier than A1 and has a higher temperature than A1 since the evaporation energy is released heating the gas. In order to avoid that liquid desiccant is carried away by the gas flow stream or as a final drying step a demister 11 may be arranged after the means for dispensing a liquid desiccant 7.

In order to control the gas flow through the housing a fan or a pump 3 may be arranged at the inlet 4 or the outlet 5 of the housing 2. The pump or fan 3 may also be arranged prior to the inlet 4.

The means for dispensing the liquid desiccant may be any suitable means and is in one embodiment a spraying means. In another embodiment the means for dispensing the liquid desiccant 7 and/or 7' is a cooling pad or evaporator pad. In order to distribute the liquid desiccant more evenly to the means 7 and 7' a distributor may be used. New and regenerated liquid desiccant is then added to the distributor which may be a container with holes or perforations in the bottom and located above the means 7 and 7'. The liquid desiccant dispensed from the means 7 and/or 7' should be in a form so that the liquid desiccant is allowed to come in contact with the gas passing through the first housing where after the liquid desiccant is collected at the liquid desiccant collecting part 13. When the means for dispensing the liquid desiccant is a cooling pad or evaporator pad the pad is preferably arranged essentially perpendicular to the gas flow. The liquid desiccant is provided at the top of the pad. Any suitably cooling pad or evaporator pad may be used such as CeLPad 0760 or CeLPad 0790 from Hutek. An advantage of using a cooling pad or evaporator pad is that the means 9 for increasing the contact time and contact area is then not necessary since the pad itself acts as such mean 9. A sensor 14 may be arranged in the liquid desiccant collecting part 13 and adapted to determine the water content in the desiccant. The sensor is preferably communicating with the control unit 36. The collected liquid desiccant S2 has a higher water content than the dispensed liquid desiccant S1 due to the absorption of water in the gas A1. The liquid desiccant S1 should be dispensed so that a minimal amount of the liquid desiccant is allowed to continue in the direction of the gas flow. This may be accomplished for example by adjusting the force with which the liquid desiccant is dispensed or by adjusting the liquid desiccant content or the liquid desiccant properties such as the density or viscosity or by using cooling pad or evaporator pad as means 7. The liquid desiccant S2 with a higher water content is allowed to exit through the outlet 15 and may be transported into at least one heat exchanger 19 via a first inlet 18. The liquid desiccant is heat exchanged in the at least one heat exchanger 19, and optionally 19', and exits the heat exchanger via a first outlet 20 resulting in a liquid desiccant S3 with a lower temperature than S2. The liquid desiccant S2 may also be recirculated, via route R1, using regulator 76' and dispensed using means 7. The regulator 76' is adapted to control the direction of the flow of the liquid desiccant i.e. if the desiccant shall be recirculated via route R1 or shall be regenerated. The liquid desiccant may be recirculated until the water absorption material is saturated or has reached a predetermined level of saturation. Prior to being dispensed the liquid desiccant may be cooled using a cooling device 60. New or fresh liquid desiccant is supplied using a liquid desiccant supplying device 62 configured to supply the liquid desiccant. The device 62 may communicate with the control unit 36 in order to monitor the need for new or fresh liquid desiccant. The device 62 may be communicating with the second housing 21 or with the means for dispensing liquid desiccant 7, preferably via the cooling device 60. New, fresh, recirculated or regenerated liquid desiccant may be cooled to a desired temperature using the cooling device 60. The cooling device may be, but is not restricted to, a fan and a heat exchanger, a sorption cooling device or a heat pump. By lowering the temperature of the recirculated liquid desiccant, or the regenerated desiccant, the desiccant may obtain a temperature lower than the ambient air. This would make the device an efficient cooling and dehumidifying device.

The device further comprises a regenerating section β. When the water content of the liquid desiccant has reached a predetermined value or after a predetermined time the desiccant is regenerated. The desiccant regeneration section comprises an optional first heat exchanger 19 (primary first heat exchanger) and optionally also 19' (a secondary first heat exchanger), a second housing 21, optionally a restrictor 66 and optionally means for flow control 76 and 78.

The desiccant to be regenerated enters the optional first heat exchanger 19 via inlet 18 and exits via outlet 20 and then into the optional secondary first heat exchanger 19' via inlet 24 and exits via outlet 35 and then to the second housing 21 via inlet 22 using a pump 74. The desiccant has now been heated by a flow (e.g. a counter flow) of concentrated desiccant (in the primary heat exchanger) and condensed water (in the secondary heat exchanger) leaving the housing 21. The liquid desiccant may further be heated using a first heating device 23' prior to entering the second housing 21. The first heating device 23' may be an electric heater, district heating, solar heating or any suitable thermal heater. Second housing 21 may be thermally insulated in order to minimize energy losses.

Each second housing 21 comprises a first inlet 22, a first outlet 30, a second heating device 23 and/or a second heat exchanger 29 in thermal contact with the liquid desiccant S3. The second heating device 23 is arranged to heat the desiccant inside the housing to the boiling point of water. The second heating device 23 might be an electric heater, district heating, solar heating or any suitable thermal heater. The inlet 22 and the first outlet 30 of the second housing may be sealable. The second housing 21 may be connected to a compressor 27, the compressor 27 may be arranged inside or outside the housing 21. The compressor is preferably arranged inside the housing in order to limit the energy losses, and the compressor 27 communicates with the second heat exchanger 29. The compressor 27 may be a suitable pump such as a vacuum pump. When the housing is connected to an external compressor 27 the housing has a second outlet 25 which communicates with the compressor 27. The second housing 21 may also comprise a demister 80 arranged prior to the outlet 25.

The liquid desiccant S3 enters the second housing 21 via the first inlet 22 which communicates with the first outlet 20 or 26 of the primary or secondary heat exchanger 19 or 19'. The heating device or the second heat exchanger, which may communicate with the control unit 36, heats the liquid desiccant in the second housing in order to evaporate water to form a more concentrated liquid desiccant S4. The amount of heat added by the second heating device 23 depends on for example the temperature of the liquid desiccant entering the second housing, if a second heat exchanger is present how much heat is provided by the second heat exchanger 29 to the liquid desiccant and the pressure in the second housing 21. The pressure in the second housing may be reduced in order to lower the boiling point of the liquid desiccant using a pump.

Referring now to FIG. 1a). If the second housing only comprises a second heating device 23 the vapour W1 exits the second housing via outlet 25 and optionally demister 80 and into the third heat exchanger 65. In the third heat exchanger the water condense and the condensed water W3 may be collected at the outlet 67. The concentrated liquid desiccant may exit through outlet 30. In one embodiment the concentration of the liquid desiccant in the second housing 21 after evaporation of the water is around 30-70% or just below the point of precipitation of the desiccant salt. The concentrated liquid desiccant S4 is then diluted with collected liquid desiccant S2 prior to exiting through outlet 30 in order to make the desiccant more easily to pump.

Figure 1B:
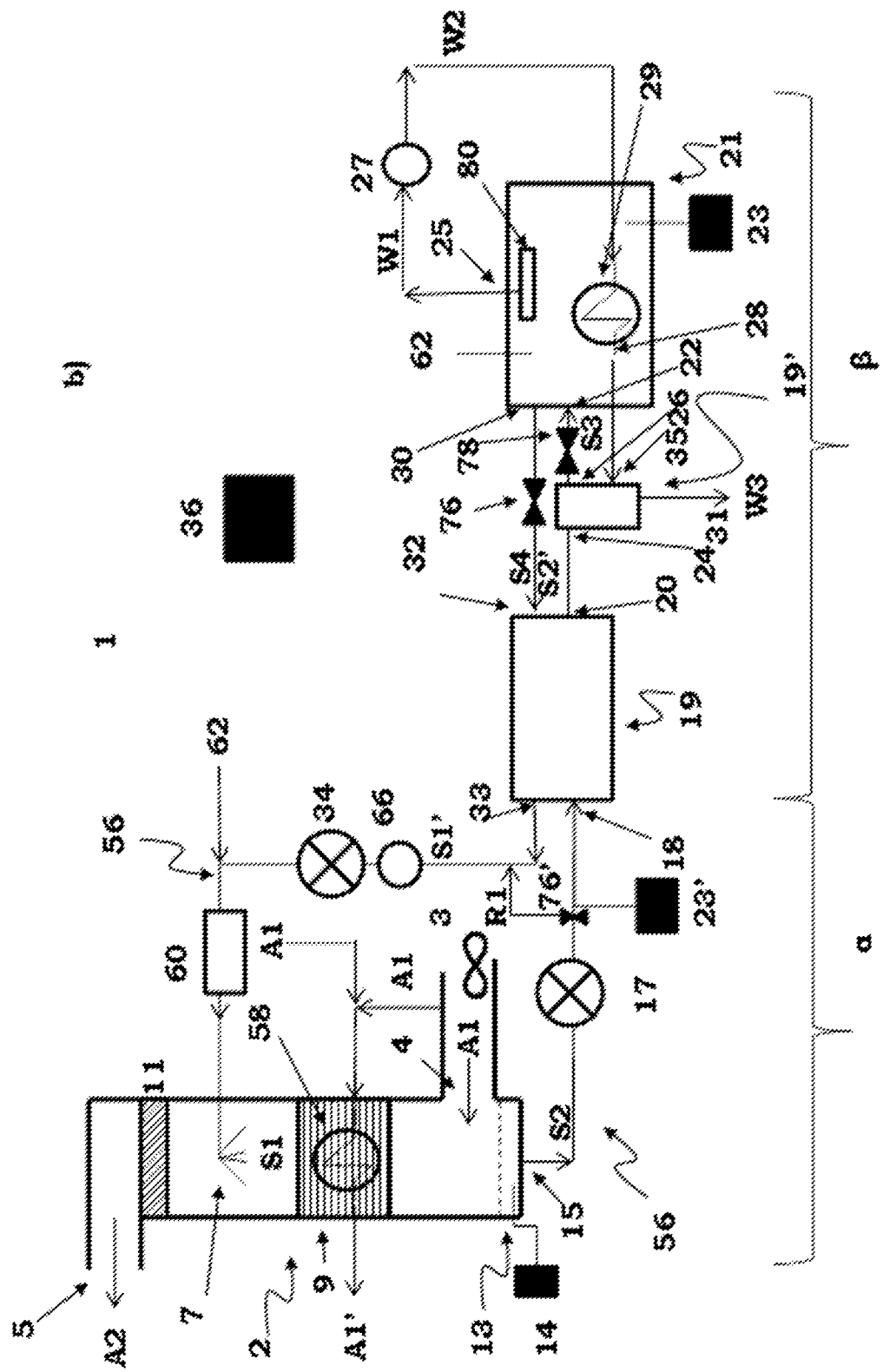
Figure 1C:
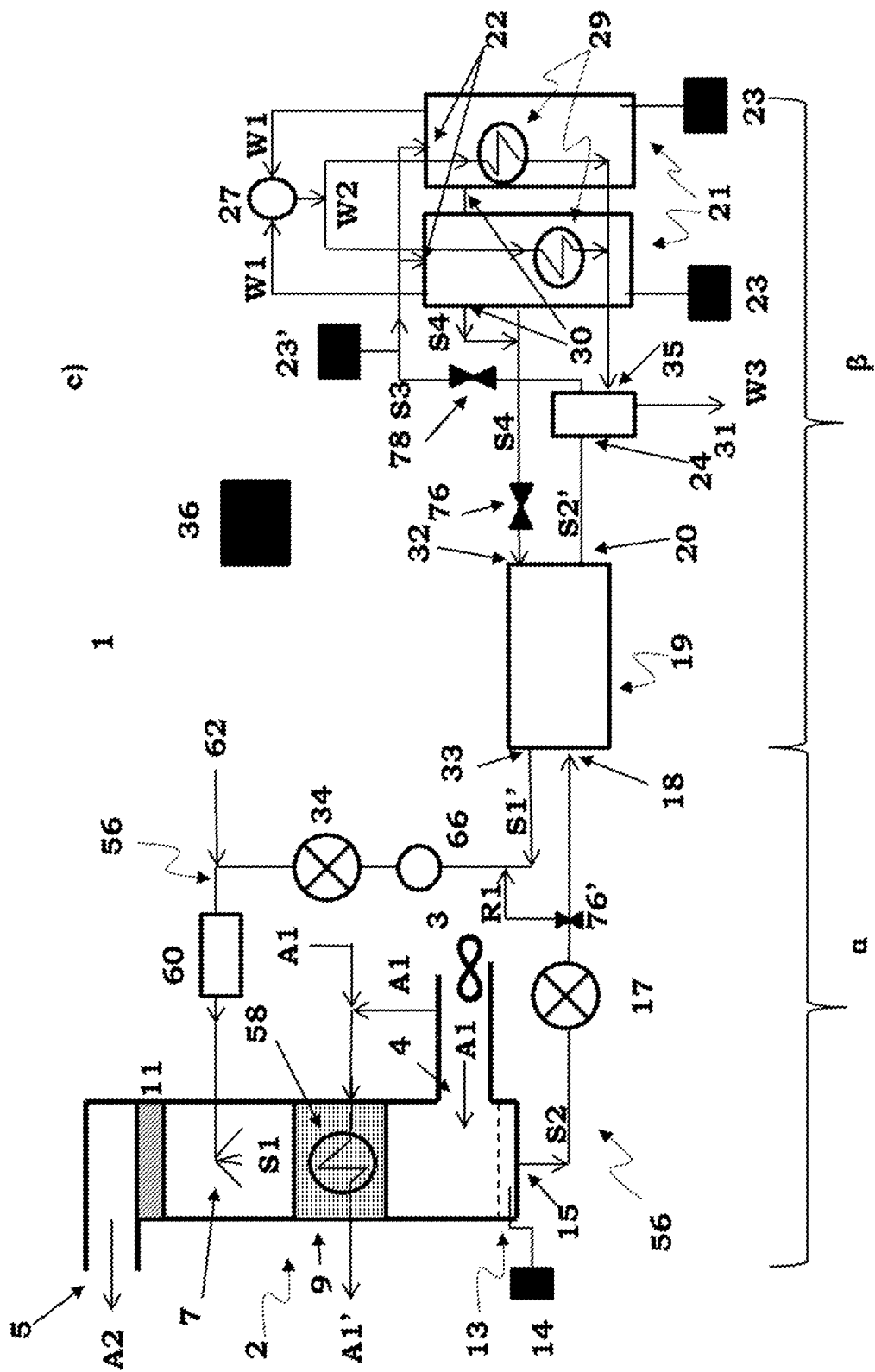

Referring now to FIGS. 1b) and 1c). A vapour W1 is generated during heating which enters the compressor 27 optionally via the second outlet 25. The second outlet 25 may be sealable. A demister 80 may be arranged prior to the compressor 27 in order to capture droplets and the demister is preferably arranged inside the second housing 21. The vapour W1 is compressed in the compressor 27 to obtain a vapour W2 with a boiling point above the boiling point of the liquid desiccant in the second housing and the vapour W2 is then allowed to enter the heat exchanger 29 where the vapour is heat exchanged with the liquid desiccant S3 in the second housing 21. When the vapor is condensing the vaporization heat is released in an exothermic reaction. The vaporization heat is transferred to the desiccant through the heat exchanger 29. The heat exchange leads to a temperature decrease of the vapour W2 which leads to formation of a condensate W3 which may exit through an outlet 28 of the second heat exchanger and where the liquid desiccant S3 is heated by the heat from the vapour W2. The outlet 28 may communicate with an outlet 31 where the water may be withdrawn from the device 1. Preferably the condensed water W3 enter the secondary first heat exchanger 19' where it is heat exchanged with the liquid desiccant S2' prior entering the second housing 21. The amount of water W3 collected per time unit from the outlet 28 is preferably similar or the same amount as the amount of water entering the first housing with the gas A1 per time unit. The denotation of the liquid desiccant S1-S4 should only be seen as schematic and is not limiting. The device may further comprise regulators 76 and 78 in order to control the flow of the liquid desiccant and to regulate the pressure in the pipes and the first and the second housing. There may also be a restrictor 66 arranged between the outlet 31 of the first heat exchanger 19' or the outlet 28 of the second heat exchanger 29 and the means for dispensing the water 44 or the cooling device 60 in order to regulate the pressure of the water. If the outlet 31 or the outlet 28 communicates with the water collecting part 50 the restrictor is arranged between the outlet 31 or the outlet 28 and said part 50. In the restrictor 66, which may be an expansion tank or a regulator of any suitable type, the pressure of the steam is lowered preferably to around ambient pressure. When two or more second housing 21 are used as in FIG. 1c) each second housing comprises a second heat exchanger and optionally also a second heating device 23. The formed vapour W1 may be compressed in a compressor 27, which may be a suitable pump such as a vacuum pump, which communicates with the second heat exchanger as described above. There may be one or more compressor 27 such as one compressor per each housing but preferably there is only one compressor for all the second houses. This set up with two or more second housing makes it easier to scale up the process.

The liquid desiccant S3 in the second housing 21 is concentrated by removing water through evaporation by heating the liquid desiccant using the heating device 23 and/or the heat exchanger 29. The concentrated liquid desiccant S4 exits the second housing 21 through the first outlet 30 and into the heat exchanger 19 via a second inlet 32. The liquid desiccant S4 is heat exchanged in the heat exchanger 19 with the liquid desiccant S2 resulting in a temperature decrease of the liquid desiccant S4 forming the liquid desiccant S1' exiting the heat exchanger 19 through a second outlet 33. The desiccant leaving the housing 21 will have a low concentration of water and a low vapor pressure.

The device 1 comprises at least one pump such as 17 or 34 configured to facilitate a flow of the liquid desiccant from the liquid desiccant collecting part 13 through the heat exchanger 19 into the second housing 21 and into the heat exchanger 19 and to the means for dispensing the liquid desiccant 7. The number of pumps should be as many as necessary to facilitate that the liquid desiccant and the aqueous solution or water may be transported within the device and the air cooler according to the present invention. The number of pumps may be one, two, three, four, five or six or more. In one embodiment the device according to the present invention comprises at least two pumps 17 and 34.

The pumps used in the present invention may be arranged at any suitable position in the device. In one embodiment the pump may be one or more of a linear pump, diaphragm pump, piston pump or a rotary vane pump. The selection of pump or pumps is dependent on the wanted pressure. The COP value (Coefficient of Performance) should be as high as possible.

In order to make the absorption process more efficient and in order to keep the temperature of the gas A2 exiting the first housing the device may further comprise a heat exchanger 58 arranged in the first housing 2. The heat exchanger 58 may use any suitable cooling media to cool the gas passing through the first housing 2. In one embodiment the heat exchanger uses the incoming gas A1 as the cooling media to heat exchange the gas during the water absorption. In another embodiment the heat exchanger uses ambient air as the cooling media. The cooling media used in the heat exchanger 58 may be cooled in the cooling device 60 prior to entering the heat exchanger 58. The dried gas A2 exiting the first housing will then have the same or very similar temperature as the incoming gas A1 and the gas A1 used as the cooling media will exit the heat exchanger as A1'. The heat exchanger 58 may be arranged in thermal contact with the means 9 for increasing the contact time and contact area between the gas and the liquid desiccant. In one embodiment the heat exchanger 58 is arranged in thermal contact with the dispensed liquid desiccant.

In one embodiment the device comprises
a first housing 2 having a first gas inlet 4 and a first gas outlet 5, at least one means for dispensing a liquid desiccant 7, optionally means 9 for increasing the contact time and contact area between the gas and the liquid desiccant, optionally a demister 11 arranged after the means for dispensing a liquid desiccant 7 in the direction of the gas flow and a liquid desiccant collecting part 13 having an outlet 15;
whereby the device is configured to allow a gas to flow from the first gas inlet 4 of the first housing, via means 9 and to exit through the first gas outlet 5 and whereby the device is configured to allow the liquid desiccant to be dispensed and brought into contact with the gas flow and collected at the desiccant collecting part 13;
a primary first heat exchanger 19 having a first inlet 18 communicating with the outlet 15 of the liquid desiccant collecting part 13, a first outlet communicating with a first inlet 22 of a second housing 21, a second inlet communicating with a first outlet 30 of the second housing 21 and a second outlet 33 communicating with the means for dispensing a liquid desiccant 7;
the second housing 21 comprises the first inlet 22, and a compressor 27, the outlet 30, a second heating device or heater 23 configured to heat the liquid desiccant in the second housing to produce vapour, a second heat exchanger 29 having an inlet and an outlet 28 wherein the second heat exchanger is in thermal contact with the liquid desiccant in the second housing 21 and a compressor 27 configured to compress the produced vapour and wherein the compressor 27 communicates with the inlet of the second heat exchanger 29;
wherein at least one pump is arranged in the device configured to facilitate a flow of the liquid desiccant from the outlet 15 to the means for dispensing a liquid desiccant 7;
whereby the device is configured to allow the liquid desiccant exiting outlet 15 to enter the primary first heat exchanger 19 via inlet 18 and into the second housing 21 via inlet 22, and to allow a liquid desiccant to exit the second housing 21 via the first outlet 30 to the primary first heat exchanger 19 via inlet 32 and exit the primary first heat exchanger 19 via outlet 33 to the means for dispensing the liquid desiccant 7; wherein the device is further configured to heat the liquid desiccant in the second housing 21 with the heater or heating device 23 and/or the second heat exchanger 29 to generate vapour; wherein the device is configured to allow the vapour to be compressed in the compressor 27 and wherein the vapour is allowed to condense in the second heat exchanger 29 and exit through the outlet 28.

Figure 2:
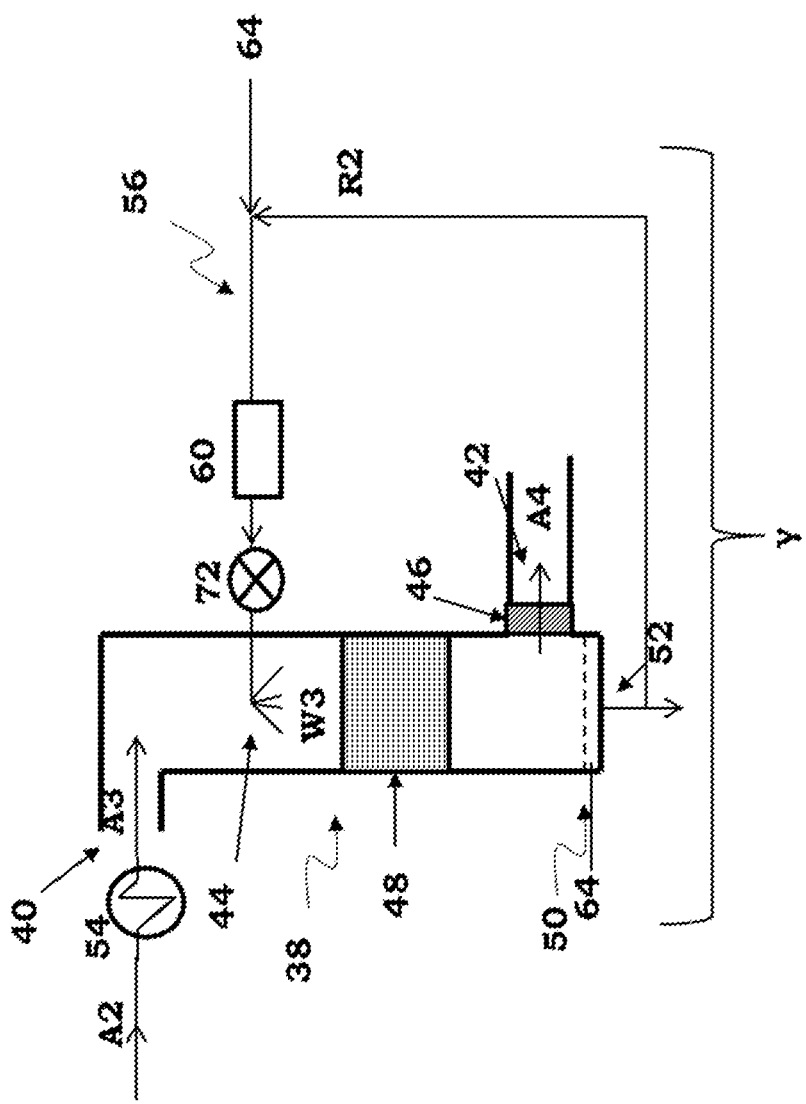
FIG. 2, a schematic view of a cross-section of a section of the present invention.

Referring now to FIG. 2. The device may be used as an air cooler 10. The air cooler comprises the device for absorbing water from gas 1 and a humidifier γ. The humidifier comprises a third housing 38 having a first inlet 40 and a first outlet 42, at least one means for dispensing an aqueous solution 44, optionally means 48 for increasing the contact time and contact area between the gas and the aqueous solution W3 (for example water) and which may be arranged prior to the means for dispensing water 44 in the gas flow direction. The means for dispensing water 44 is preferably arranged so that the dispensing of water is done essentially in the direction of the gas flow or in a parallel direction to the gas flow. The means 44 may comprise a mouthpiece or nozzle with openings or outlets in the direction of the gas flow. The humidifier or cooling section γ further comprises a water collecting part 50 having an outlet 52 and the humidifier may comprise a heat exchanger 54 arranged prior to the first inlet 40 in the direction of the gas flow and it may also comprise a demister arranged after the means for dispensing water 46. The water collecting part 50 may be a separable part from the housing 38 or it may be an inseparable part of the housing 38. The collecting part 50 may be made of the same material as the first housing 38 or it may be made of another material. Preferably the means for dispensing an aqueous solution is arranged so that the aqueous solution is dispensed in the direction of the gas flow. This will make the cooling more efficient.

The heat exchanger 54 communicates with the first outlet 5 of the first housing so that the gas A2 exiting the first housing through the outlet 5 is cooled in the heat exchanger 54 to provide a gas A3. The means for dispensing water 44 may communicate with the outlet 28 or 31 of the second heat exchanger in the regeneration section β so that the water extracted or absorbed from the incoming gas A1 is reused to humidify the gas A2/A3. A pump 72 may be arranged configured to transport water from outlet 28 or 31 to the means 44. The gas A3 is humidified by the aqueous solution W3 and the temperature of the exiting gas A4 is also lower than the gas A3 since the evaporation energy is absorbed cooling the gas. The water collected at the water collecting part 50 may be reused, route R2, as the aqueous solution W3. New or fresh water is supplied using a water supplying device 64 configured to supply water or aqueous solution and which may be communicating with the means 44 optionally via a cooling device 60 or the water collecting part 50. The device 64 is preferably communicating with the control unit 36 in order to monitor the quality of the water and the need for new or fresh water. The water is preferably cooled using the cooling device 60 prior to dispensing.

Recirculated liquid desiccant or water via route R1 and R2 may be cooled using the cooling device 60 prior to being re-dispensed via means 7 or 44. The cooling device is arranged between the outlet 15 or 52 and the means for dispensing 7 or 44.

The different parts (first to third housing, pumps, heat exchanger and second housing for example) of the device are connected via suitable tubing 56. The tubing 56 should preferably be insulated in order to minimize energy losses and to avoid condensation in the tubing. The device may further comprise any suitable number of pumps or fans configured to transport gas or liquid desiccant or water.

The device 1 may further comprise a control unit 36 configured to optimize the energy and the amount of water extracted from the gas and the properties for regenerating the liquid desiccant. The control unit may control the pressure of the at least one pump 17, 34, 60, 70, 72 and 74, the amount of heat added by the first and the second heating device 23' and 23 to the liquid desiccant in the second housing 21 and the working pressure of the compressor 27 in relation to the amount of gas entering the first inlet 4 and the amount of water in said gas in order to optimize the amount of water exiting the outlet 28. The control unit also controls the restrictor 66 and the concentrations of the liquid desiccant. The control unit 36 may comprise one or more sensors arranged in the device for example in the second housing 21 in thermal contact with the liquid desiccant, in the heating device 23, in the compressor 27 and/or restrictor 66, in the pipes 56, at the liquid desiccant or water collecting part 13 or 50, at the first inlet of the first or the third housing 4 or 40 respectively. The control unit preferably comprises a suitable software in order to adjust the settings or properties of the different parts of the device.

The first and the second heating device 23' and 23 may be maneuvered using electricity, fuel cells, solar energy or in any other suitable way and the heat could be supplied via districting heating, electricity, microwaves (for example via the microwave oven principle) or via solar energy.

The first and third housing may be arranged in an essentially horizontal or upright position. In one embodiment the gas flow through the first and/or the third housing is essentially horizontal. This could be obtained by having the inlets 4 and 40 arranged in essentially the same horizontal plane as the outlets 5 and 42. The first housing 2 or the third housing 38 may also comprise a part or a section between the first inlet 4/40 and the first outlet 5/42 wherein said part is configured to allow a horizontal gas flow and wherein the at least one means for dispensing the liquid desiccant 7 is arranged in said part or section. In one embodiment the part or section is the part or section of the first or the third housing where the gas comes into contact with the liquid desiccant or the water. Having a horizontal gas flow makes the device more efficient which becomes even more evident when the means for dispensing the liquid desiccant 7 is arranged in the housing 2 at angle of or close to perpendicular to the gas flow.

The different sections α, β and γ may be arranged in a common housing or separately. Sections α and γ are herein described as different sections but may be just one section where the outlet 5 and the inlet 40 are the same see FIG. 3.

The device is preferably constructed in order to minimize energy losses. For example the compressor 27 may be adiabatic, isothermal or isentropic with a minimal loss of energy to the surroundings. In one embodiment the compressor is insulated. The compressor should compress the vapour as little as possible in order to obtain a high efficiency. The compressor should compress the vapour just enough so that the boiling point of the vapour is higher than the boiling point of the liquid desiccant in the second housing 21. In one embodiment the compressor 27 compresses the vapour from around 300-800 mbar such as 400-700 mbar to 1.1-2.5 bar such as 1.2-2 bar or 1.3-1.8 bar. The compressor may be arranged outside of the second housing (FIGS. 1*b-c* and 3) or inside the second housing (FIG. 4). When the compressor is arranged inside the second housing the compression of the gas is preferably done isothermally which facilitates that the heat generated during the compression may be used to heat the liquid desiccant in the second housing. Therefore the compressor should therefore be arranged in thermal contact with the liquid desiccant. Besides saving energy by heating the liquid desiccant the vapour or steam does not have to be compressed as much which in turn also saves energy.

The walls of the housings may be made of but not limited to metals or metal alloys. However walls made of a heat insulation material will reduce thermal losses and therefore a non-limiting list of suitable materials are glass wool, plastic, cellular plastic, rubber, cellular rubber or combinations thereof. Therefore, the walls of the first and/or the second housing are preferably made of a heat insulation material. The inner surface of the first or second housing may have a heat insulation value of less than $1\lambda(Wm^{-1}K^{-1})$ preferably less than $0.5\lambda$. In one embodiment the second housing 21 is thermally insulated. In one embodiment the first and/or second housing has a heat insulation material on the inner surface inside and a metal or metal alloy on the outside. Furthermore, the housing (first and/or second housing) may have a thickness so that the thermal conductance is less than $0.02\ Wm^{-1}$, preferably less than $0.005\ Wm^{-1}$.

The second housing 21 may be thermally insulated from the second heating device 23 so that the housing is not heated during heating of the liquid desiccant. The housing may be made of a non-transparent material, in one embodiment the housing has a small window for inspection.

The temperature of the second heating device 23 should be enough to evaporate some of the water in the liquid desiccant. In one embodiment the temperature is the boiling temperature of the liquid desiccant in the second housing. In one embodiment the temperature is 80° C. or higher, or 90° C. or higher, or 100° C. or higher. In one embodiment the pressure in the second housing is reduced using a suitable pump.

The walls and the bottom of the first housing 2 may be constructed in such a way that the liquid desiccant easily flows along the walls and assembles at the collecting part 13. This may be accomplished by having grooves, trenches, channels or the like in or along the walls of the housing, they may further continue along the bottom plate of the housing towards the collecting part 13. These grooves, trenches or channels could be made of or covered with hydrophobic material. The bottom plate could be constructed in such a way that all the water from the walls and from the hygroscopic material is assembled. This could be achieved by having the bottom lean into one or more spots in the part 13.

When the water vapor from the gas is absorbed by the desiccant, the vaporization heat is released in the phase transition from vapor to water. The means for dispensing the desiccant 7 and the flow of the desiccant is arranged such that heat of vaporization and water from the gas is transferred away from the housing 2 by the desiccant, for example by dispensing the liquid desiccant essentially vertically while the gas flow is essentially horizontal. When the gas and the desiccant have the same vapor pressure, the desiccant will not absorb any more water vapor. However, if there is a temperature difference between the two media, heat energy will still be exchanged between the gas and the desiccant. Hence, the temperature and the vapor pressure of the gas or air exiting the outlet 5 might be the same as that of the liquid desiccant before being entering into the first housing 2. Hence, the temperature of the gas might be lower and the humidity content of the gas might be lower than the gas entering the housing. This is even more pronounced when the gas flow through the first and/or the third housing is horizontal as disclosed in the embodiments of FIGS. 3 and 4.

The dehumidified gas or air entering the γ section might have the same vapor pressure and temperature as the desiccant, and therefore a low relative humidity. A low relative humidity will allow the gas to be cooled through sorption cooling, i.e. humidification. Sorption cooling, or humidification, of the gas is here made through any means known to a person skilled in the art herein denoted means for dispensing water 44. The water used for the sorption cooling might be but is not restricted to, taken from the water collecting part 50. Since the gas leaving the dehumidification section α will have the same or similar temperature as the liquid desiccant and the water used for sorption cooling should preferably have the same or more preferably lower temperature than the gas the water used may be lead through the cooling device 60 using a pump 72.

One advantage of the present invention is that it is very energy efficient. Since water, vaporization energy and heat energy from the gas is transferred to the desiccant, the desiccant needs to be cooled and regenerated. However, since the vaporization energy is high, i.e. 2260 kJ/kg, the temperature change in the desiccant will be much larger than the change of water concentration. As an example, if one kilogram of a desiccant absorbs 10 gram of water, the temperature rise due to the vaporization energy might be 5.3 Kelvin while the concentration only changes 0.4 percent.

An Air Cooler

Figure 3:
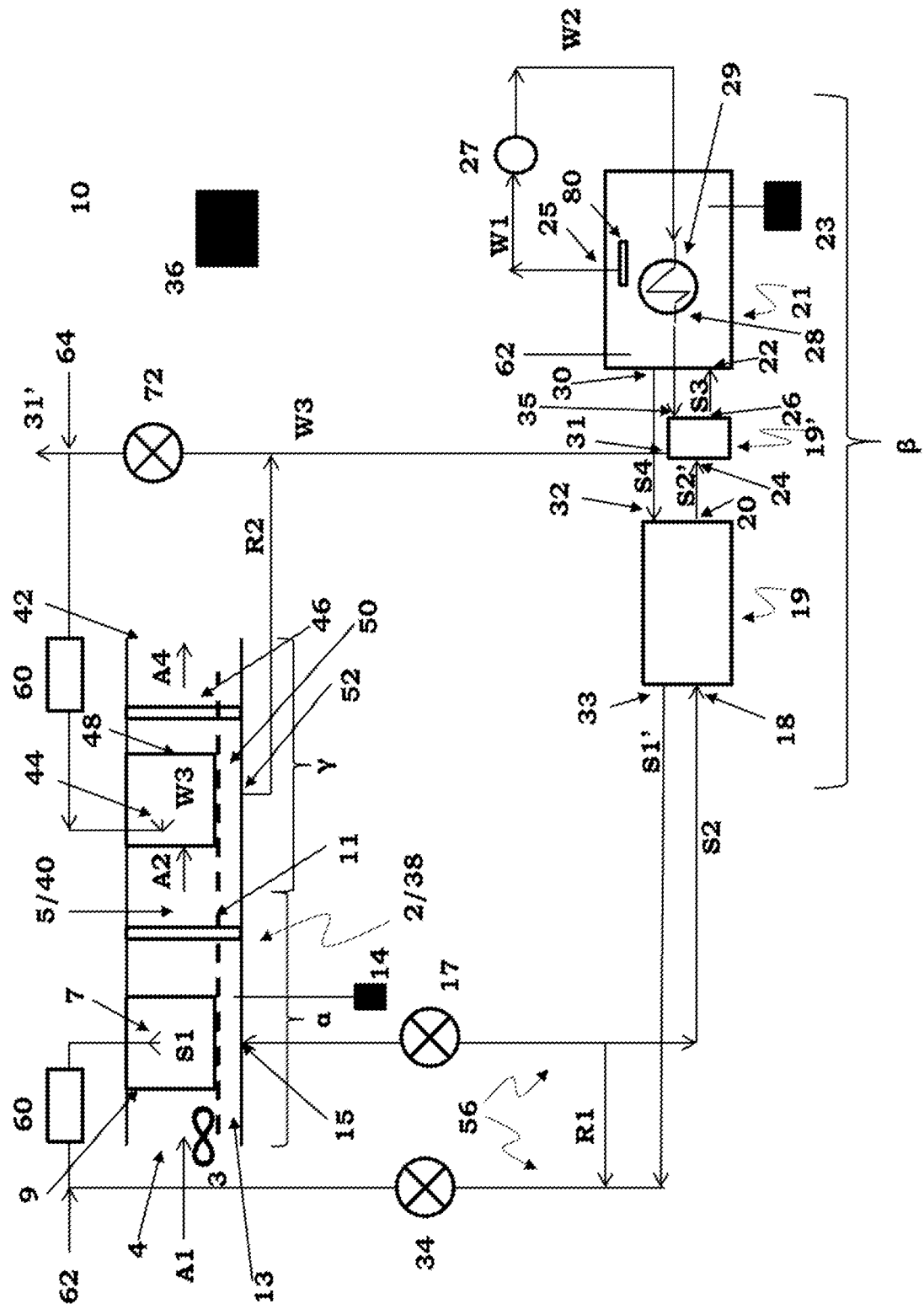
FIG. 3, a schematic view of a cross-section of the present invention.
Figure 4:
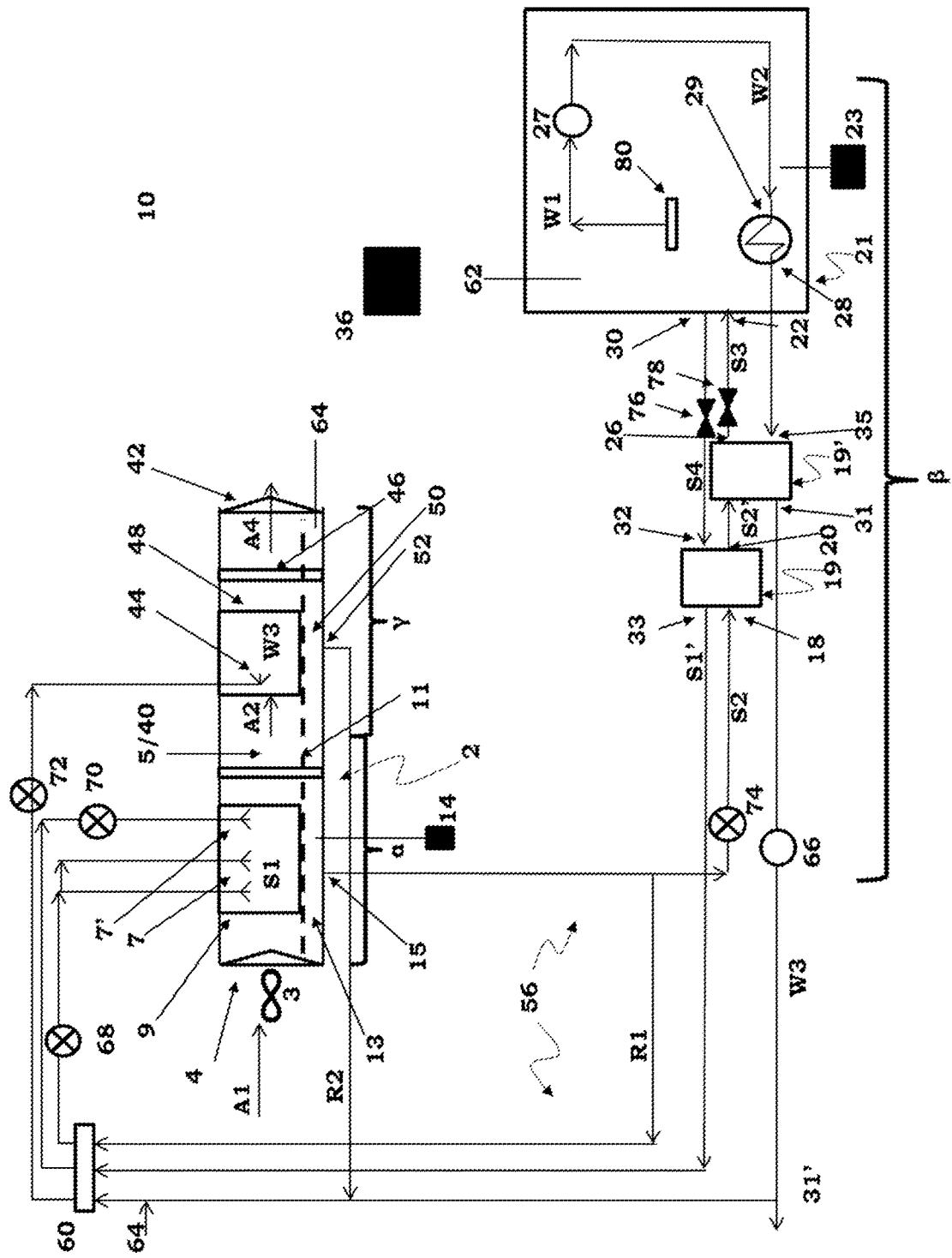
FIG. 4, a schematic view of a cross-section of the present invention.

One embodiment of the present invention relates to an air cooler 10 schematically disclosed in FIGS. 3 and 4 where all three sections α, β and γ as described above are included.

The dehumidification section α comprises a housing 2 with a gas inlet 4 and a gas outlet 5 and two or preferably three means or more for dispensing a water absorption desiccant 7 and 7' and preferably means for increasing the contact time and/or contact area between the gas and the water absorption desiccant 9 and a demister 11 is preferably arranged prior to the outlet 5.

Now, referring to section γ in FIG. 4—the sorption cooling section. The sorption cooling section comprises the housing 2 (corresponding to the third housing 38) with an inlet 40 and an outlet 42, at least one means for dispensing aqueous solution or water 44 and a water collecting part 50 with an outlet 52. The means for dispensing water is arranged so that the dispensing of water is done essentially in the direction of the gas flow. The water collecting part 50 may be connected to an external supply of new or fresh water 64. Between the two sections α and γ there may be a means for sealing such as a valve, check valve, door, shutter or gate of suitable type.

The desiccant is collected in the part 13 and may be recirculated via route R1. The desiccant from the tray 13 may be transported to a cooling device 60 using a pump 68. The desiccant is then recirculated back to the second housing 2 via the means 7. When the desiccant is recirculated the water content in the liquid desiccant will increase for each time and the desiccant and may need to be regenerated. The sensor 14 is configured to determine the water content in the liquid desiccant in the part 13 and communicates with the control unit 36.

The outlet 5 of the dehumidification section α communicates with the inlet 40 of the sorption section γ and may be connected by suitable tubing in order to allow the dried gas from the dehumidification section to enter the sorption section. In one embodiment the outlet 5 and the inlet 40 are the same.

Now, referring to section β—desiccant regeneration section. The regeneration section may be any regeneration section described above. Section β may comprise a secondary first heat exchanger 19', an optional demister 80, an optional first heating device 23' and optionally a restrictor 66 and the liquid desiccant entering the second housing 21 may thereby be heated by two heat exchangers 19 and 19' prior to entering the second housing. The pump or compressor 27 is arranged inside, or outside, the second housing 21 wherein the compressor is preferably in thermal contact with the liquid desiccant in order to transfer any heat generated during the compression to the liquid desiccant.

The concentrated or regenerated desiccant S4 is transported to the heat exchanger 19 using pump 70. The desiccant leaving the housing 21 will have a low concentration of water and a low vapor pressure, therefore the regenerated desiccant will be transported to the cooling device 60 where the temperature is lowered further and then transported to the means for dispensing the regenerated desiccant 7' arranged last of the means for dispensing liquid desiccant in the direction of the gas flow.

The Method of Absorbing Water and Cooling Air

The method and the flow of the gas and liquids according to the present invention will now be described with reference to FIGS. 5a) and 5b). In the following description the denoted gas flows (A1-A2) and liquid desiccants (S1-S4) should only be seen as illustrative not limiting.

A gas flow A1 is allowed to enter the first housing 100 via the first inlet 4. A liquid desiccant S1 is dispensed 102 and the gas flow A1 is brought into contact with the liquid desiccant and the optional means 9 for increasing the contact time and contact area between the gas and the liquid desiccant. Water or moisture is allowed to be absorbed by the water absorption material in the liquid desiccant 104. The liquid desiccant that has been brought into contact with the gas flow S2 is then collected 106 and the gas flow A2 is allowed to exit the first housing 2 through the outlet 5 108. The liquid desiccant S2 is allowed to exit the first housing via the outlet 15 and is then preferably heat exchanged 110 using heat exchanger 19 and optionally 19' or the liquid desiccant is heated by a first heating device 23' 110. The heated liquid desiccant S3 exiting the at least one optional heat exchanger is collected 112 in the second housing 21. The further steps of the method is now described according to FIGS. 5a) and 5b).

Figure 5:
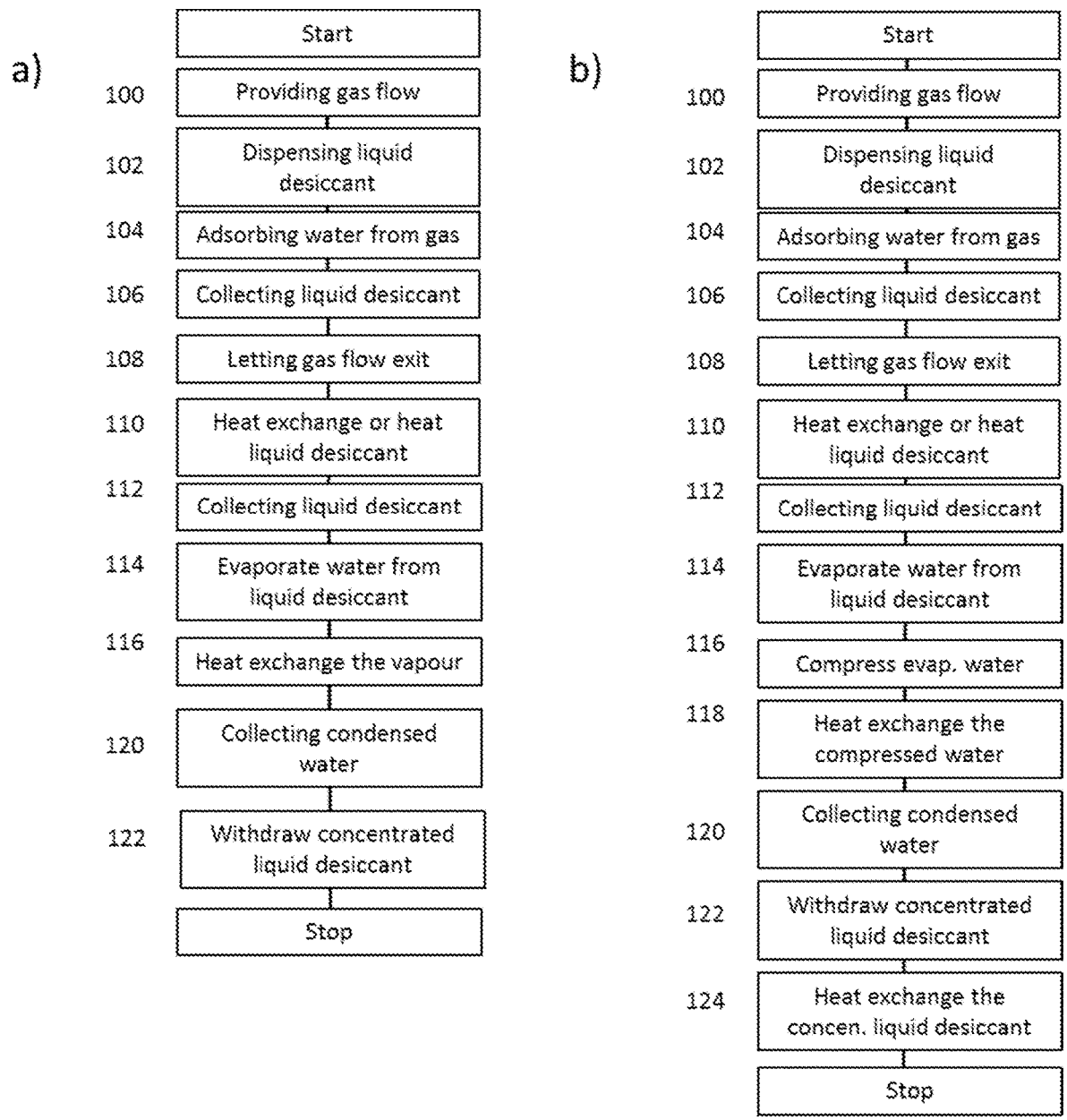
FIG. 5, a schematic scheme of the method of absorbing water.

Referring now to FIG. 5a). Water is evaporated from the collected liquid desiccant 114 using the second heating device 23 and the evaporated water is heat exchanged 116 forming a condensation and the water is collected 120. A concentrated liquid desiccant S4 is withdrawn from the second housing 122.

Referring now to FIG. 5b). Water is evaporated from the collected liquid desiccant 114 using the second heating device 23 and/or the second heat exchanger and the evaporated water is compressed 116 to obtain a boiling point above the boiling point of the liquid desiccant in the second housing, or the vapour is or heat exchanged 116. The compressed evaporated water is heat exchanged with the liquid desiccant in the second housing 118 so that the liquid desiccant is heated and the vapour in the heat exchanger is cooled to condensate and the water is collected 120. A concentrated liquid desiccant S4 is withdrawn from the second housing 122 and the concentrated liquid desiccant is optionally heat exchanged 124 with the liquid desiccant S2 to form the liquid desiccant S1/S1'. The liquid desiccant S1/S1' may optionally be cooled using a cooling device 60.

Figure 6:
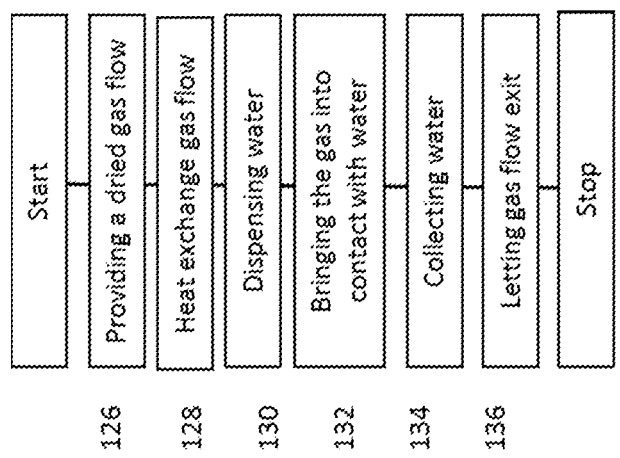
FIG. 6, a schematic scheme of the method of humidifying and cooling air.

When the device is used to produce humidified cool gas or air the method further comprises the steps illustrated in FIG. 6. The dried gas A2 exiting the first housing 2 is provided 126 and may then be heat exchanged (A3) using any suitable cooling media 128. In one embodiment the media is the surrounding air or gas such as A1 using a heat exchanger. In one embodiment the liquid desiccant is cooled prior to being dispensed using a cooling device 60. An aqueous solution or water W3 is dispensed 130 and the gas flow A3 is brought into contact with the aqueous solution and the optional means 9 for increasing the contact time and contact area between the gas and the aqueous solution or water 132. The aqueous solution that has been in contact with the gas flow is then collected 134. The gas is humidified when brought into contact with the dispensed solution and the evaporation energy is absorbed cooling the gas and the cooled humidified gas exits 136. Optionally the water generated in the regeneration process and collected in step 120 may be optionally heat exchanged using a heat exchanger 19' and cooled using the cooling device 60. The water collected in step 120 may be collected in the water collecting part 50.

The invention claimed is:

1. A device (1) for absorbing water from a gas comprising:
a first housing (2) having a first gas inlet (4) and a first gas outlet (5), at least one means for dispensing a liquid desiccant (7) wherein said means is a cooling pad or evaporator pad, optionally means (9) for increasing a contact time and contact area between the gas and the liquid desiccant wherein the means (9) for increasing the contact time and contact area between the gas and the liquid desiccant is in a form of baffles, particles or beads or a bed of particles or beads, optionally a demister (11) arranged after the means for dispensing a liquid desiccant (7) in the direction of the gas flow and a liquid desiccant collecting part (13) having an outlet (15);
whereby the device (1) is configured to allow a gas to flow from the first gas inlet (4) of the first housing, optionally via means (9) for increasing the contact time and contact area between the gas and the liquid desiccant and to exit through the first gas outlet (5) and whereby the device is configured to allow the liquid desiccant to be dispensed and brought into contact with the gas flow and collected at the desiccant collecting part (13);
at least one second housing (21) comprising a first inlet (22), a first outlet (30), a second heating device (23), a second heat exchanger configured to heat the liquid desiccant in the second housing to produce vapour (W1), wherein the second heat exchanger (29) has an inlet and an outlet (28) and wherein the second heat exchanger is in thermal contact with the liquid desiccant in the second housing (21), wherein the second housing (21) communicates with a compressor (27), wherein the compressor (27) is configured to compress the vapour (W1) from the second housing;
optionally a primary first heat exchanger (19) having a first inlet (18) communicating with the outlet (15) of the liquid desiccant collecting part (13), a first outlet communicating with the first inlet (22) of the second housing (21), a second inlet (32) communicating with the first outlet (30) of the second housing (21) and a second outlet (33) communicating with the means for dispensing a liquid desiccant (7);
wherein at least one pump is arranged in the device configured to facilitate a flow of the liquid desiccant from the outlet (15) of the liquid desiccant collecting part (13) to the means for dispensing a liquid desiccant (7); and
a control unit (36) configured to adjust a pressure of the at least one pump (34), an amount of heat added by the second heating device (23) to the liquid desiccant in the second housing (21) and adjust a working pressure of the compressor (27) in relation to an amount of gas entering the first inlet (4) and an amount of water in said gas in order to adjust the amount of water exiting the outlet (28) of the second heat exchanger; and
whereby the device is configured to allow the liquid desiccant exiting outlet (15) of the liquid desiccant collecting part (13) to optionally enter the primary first heat exchanger (19) via the first inlet (18), and into the second housing (21) via the first inlet (22), and to allow a liquid desiccant to exit the second housing (21) via the first outlet (30) to the optionally primary first heat exchanger (19) via the second inlet (32) and exit the primary first heat exchanger (19) via the second outlet (33) to the means for dispensing the liquid desiccant (7); wherein the device is further configured to heat the liquid desiccant in the second housing (21) with the second heat exchanger (29) to generate vapour; wherein the device is configured to allow the vapour to be compressed in the compressor (27) and wherein the vapour is allowed to condense in the second heat exchanger (29) and exit through the outlet (28).

2. The device according to claim 1 wherein the second housing is connected to the compressor (27) arranged inside or outside the second housing (21).

3. The device according to claim 2 wherein the compressor is essentially isentropic.

4. The device according to claim 2 wherein the device further comprises a control unit (36), a sensor (14) arranged in the desiccant collecting part (13) and adapted to determine a water content in the desiccant and wherein the sensor (14) communicates with the control unit (36), at least two means for dispensing a liquid desiccant (7) and wherein said means (7) is a cooling pad or evaporator pad;
wherein the first housing comprises a part configured to allow a horizontal gas flow and wherein the at least two means for dispensing the liquid desiccant (7) are arranged in said part;
wherein the second housing further comprises a demister (80) arranged prior to the compressor (27); and
wherein a secondary first heat exchanger (19') is arranged between the primary first heat exchanger (19) and the second housing (21) and wherein the secondary first heat exchanger has a first and a second inlet (24) and (35) respectively communicating with the first outlet (20) of the primary first heat exchanger (19) and the outlet of the second heat exchanger (28) respectively, and a first and a second outlet (26) and (31) respectively wherein the first outlet communicates with the first inlet (22) of the second housing.

5. The device according to claim 2 wherein the device comprises two or more second housings (21) wherein each second housing comprises a second heat exchanger (29) and wherein each second housing communicates with the compressor (27) and wherein the device optionally further comprises a second heating device (23) configured to heat the liquid desiccant in each second housing or configured to heat the liquid desiccant prior to entering each second housing (21).

6. The device according to claim 1 further comprising a fan or a pump (3) configured to adjust the gas flow through the first housing (2).

7. The device according to claim 1 wherein the first housing is essentially horizontal orientated.

8. The device according to claim 1 wherein the device comprises at least two pumps such as three pumps, or four pumps.

9. The device according to claim 1 wherein the second housing is thermally insulated.

10. The device according to claim 1 wherein the device further comprises a secondary first heat exchanger (19') having a first inlet (24) communicating with the first outlet (20) of the primary first heat exchanger (19), a first outlet (26) communicating with the inlet (22) of the second housing, a second inlet (26) communicating with the outlet (28) of the second heat exchanger and a second outlet (31).

11. The device according to claim 1 wherein the means (9) for increasing the contact time and contact area between the gas and the liquid desiccant is in the form of baffles, particles or beads or a bed of particles or beads.

12. The device according to claim 1 wherein a heat exchanger (58) is arranged in the first housing (2) configured to cool the gas during water absorption.

13. The device according to claim 1 wherein the liquid desiccant is an aqueous solution of magnesium chloride ($MgCl_2$).

14. A dehumidifier comprising the device according to claim 1.

15. The device according to claim 1, which is an air cooler further comprising a humidifier comprising a third housing (38) having a first inlet (40) and first outlet (42), means for dispensing water (44), optionally means (48) for increasing the contact time and contact area between the gas and the water, optionally a demister arranged after the means for dispensing water (46), a water collecting part (50) having an outlet (52) wherein the first gas outlet (5) of the first housing communicates with the first inlet (40) of the third housing (38).

16. The device according to claim 15 wherein the means for dispensing water (44) is arranged so that the dispensing of water is done approximately in the direction of the gas flow.

17. The device according to claim 15 further comprising a humidifier comprising a third housing (38) having a first inlet (40) and first outlet (42), and means for dispensing the water (44), wherein the third housing (38) comprises a part configured to allow a horizontal gas flow and wherein the means for dispensing the water (44) is arranged in said part and wherein the means for dispensing the water (44) is arranged so that the dispensing of water is done essentially in the direction of the gas flow;

wherein the means for dispensing water (44) communicates with the second outlet (31) of the a secondary first heat exchanger (19');

wherein the air cooler further comprises a cooling device (60) wherein the cooling device communicates with each of the second outlet (33) of the primary first heat exchanger, the second outlet (31) of the secondary first heat exchanger and/or the water collecting part (50), and the desiccant collecting part (13) and wherein the cooling device is arranged prior to the means for dispensing a liquid desiccant (7) and the means for dispensing water (44) in the direction of the flow of the liquid desiccant and water respectively;

wherein the air cooler further comprises optionally a restrictor (66) arranged between the second outlet (31) of the secondary first heat exchanger (19') and the cooling device (60); and wherein the air cooler comprises a pump (68) a pump arranged between the cooling device (60) and at least two means for dispensing a liquid desiccant (7), a pump (70) arranged between the cooling device (60) and the at least two means for dispensing a liquid desiccant (7') and a pump (72) arranged between the cooling device and means for dispensing water (44); and wherein the first gas outlet (5) of the first housing communicates with the first inlet (40) of the third housing (38).

18. The device according to claim 15 wherein the second heat exchanger is arranged inside of the second housing (21).

* * * * *